UNITED STATES PATENT OFFICE.

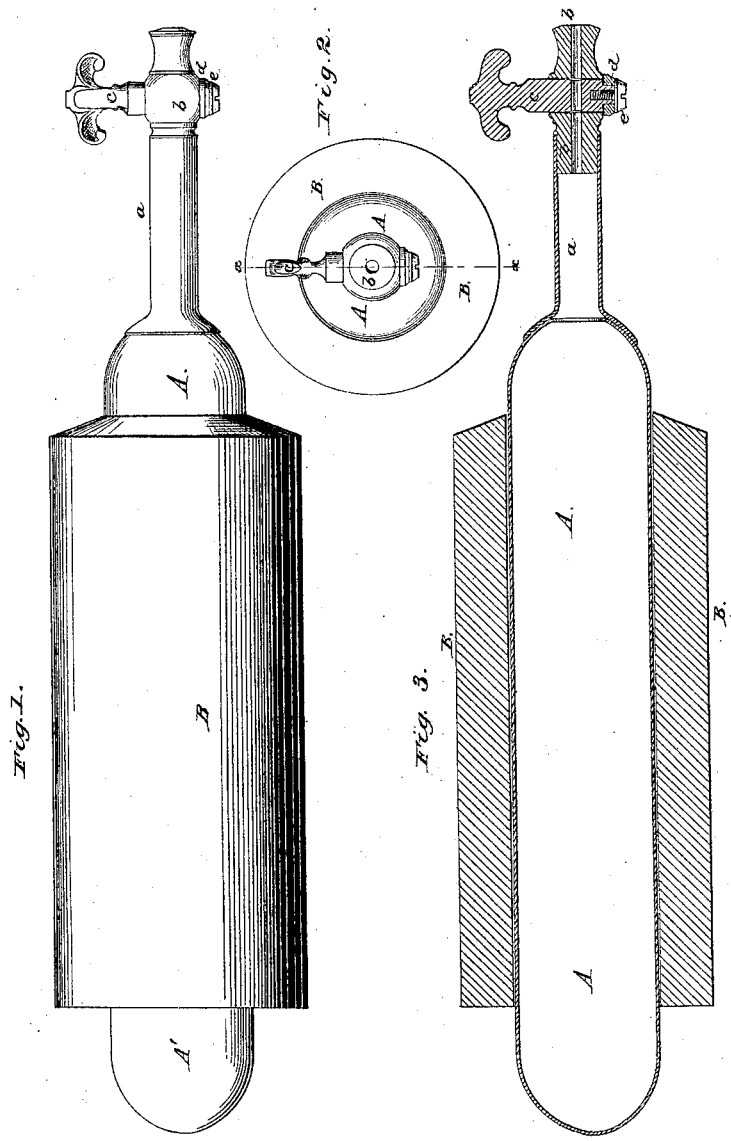

JAS. PILGRIM, OF NEW BRITAIN, CONNECTICUT.

CORE FOR MOLDING PLASTIC SUBSTANCES.

Specification of Letters Patent No. 22,450, dated December 28, 1858.

*To all whom it may concern:*

Be it known that I, JAMES PILGRIM, of New Britain, county of Hartford, in the State of Connecticut, have invented a new and useful Improvement in Cores for Molding Plastic Substances; and I do hereby declare that the following is a full and exact description thereof, reference being had to the accompanying drawings and to the letters of reference marked thereon.

My invention has for its object the construction of a core around which to mold various hollow forms in such a manner that it may be readily extracted from the form or article molded upon it, and through an orifice smaller than the cavity occasioned by its presence during the operation of molding, and consists in the formation of cores, for molding in plastic clay, cement and other similar substances, of india rubber, or other equivalent material, and in such manner that they may be inflated, and allowed to collapse, for extraction from the molded form as hereinafter fully described.

In the accompanying drawings, Figure 1 represents a side elevation of one of my improved cores, with a piece of composition pipe molded upon it. Fig. 2 represents an end view of the same and, Fig. 3, a longitudinal section on the line $x, x$ Fig. 2, similar letters denoting the same parts in the different views.

A represents a cylindrical bag of india rubber, or other flexible material, which is closed at one end A′, while at its other extremity it tapers off into a neck $a$, in the end of which is located a metallic tube $b$, furnished with an ordinary gas or stop cock.

B represents a section of composition pipe or tubing, which is supposed to have just been molded upon the core A from which latter the air is allowed to escape by opening the cock as illustrated in the drawings; when it collapses, and may be readily withdrawn, through the end of the tube or pipe. The core or bag A may be filled with air, in any desirable way, and since the manner of inflating it forms no part of my invention, it need not be here described.

It is obvious that my improved core may be made of any desired form and size and of various materials, without departing from the nature of my invention; though for its formation I have found the india rubber cloth, in practice, most desirable. It will also be observed that my improvement is particularly applicable and advantageous in the construction of composition cisterns, and other formations, where the orifice through which, the core has to be extracted, is much smaller than the cavity formed; since a core thus constructed, may be entirely collapsed, and drawn through a very small hole. I do not therefore desire to limit myself to any particular form of core, or material of the same, or to any exact arrangement of the inflating and exhaust devices. But

I claim as my invention and desire to secure by Letters Patent—

Constructing cores, for molding in plastic clay, cement, or other like substances, of india rubber, or equivalent, material, so, that they may be inflated and collapsed substantially as described.

In testimony whereof I have hereunto set my hand and seal this 18th day of October, 1858.

JAMES PILGRIM.

Witnesses:
JOSEPH WARNER,
WM. H. GRIMES.